(12) United States Patent
Yu

(10) Patent No.: US 6,726,597 B2
(45) Date of Patent: Apr. 27, 2004

(54) SHIFT CONTROL METHOD FOR AUTOMATIC TRANSMISSION

(75) Inventor: Pyung-Hwan Yu, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/101,259

(22) Filed: Mar. 18, 2002

(65) Prior Publication Data
US 2002/0165065 A1 Nov. 7, 2002

(30) Foreign Application Priority Data
May 4, 2001 (KR) ......................... 2001-24259

(51) Int. Cl.⁷ ............................................. F16H 59/30
(52) U.S. Cl. ........................ 477/121; 477/125; 701/54
(58) Field of Search ............................... 477/121, 115, 477/125; 701/53, 54, 62, 64; F16H 59/18

(56) References Cited

U.S. PATENT DOCUMENTS

| | | | | |
|---|---|---|---|---|
| 4,350,057 A | * | 9/1982 | Kishi et al. ................. | 477/121 |
| 4,412,290 A | * | 10/1983 | Pannier ........................ | 701/66 |
| 4,559,599 A | * | 12/1985 | Habu et al. ................... | 701/62 |
| 4,853,673 A | * | 8/1989 | Kido et al. ................... | 340/439 |
| 5,025,684 A | * | 6/1991 | Stehle et al. .................. | 477/62 |
| 5,471,894 A | * | 12/1995 | McFadden ................... | 74/336 R |
| 5,658,217 A | * | 8/1997 | Tsukada ...................... | 477/109 |
| 5,810,692 A | * | 9/1998 | Takiguchi et al. ........... | 477/144 |
| 5,826,208 A | * | 10/1998 | Kuroiwa et al. ............. | 701/54 |
| 6,295,884 B1 | * | 10/2001 | Miyake et al. ............... | 74/335 |
| 6,491,603 B1 | * | 12/2002 | Steeby ......................... | 477/118 |
| 6,527,672 B1 | * | 3/2003 | Henneken et al. .......... | 477/125 |

* cited by examiner

Primary Examiner—Charles A. Marmor
Assistant Examiner—David D. Le
(74) Attorney, Agent, or Firm—Morgan Lewis & Bockius LLP

(57) ABSTRACT

A shift control method for an automatic transmission is provided that includes: an ECU control of generating a throttle compensation control flag having data for whether a shift delay is needed, and of transmitting the generated throttle compensation control flag to a TCU, when a throttle opening rate is controlled in such a way that the throttle opening rate is not proportional to a depression of an acceleration pedal; and a TCU control of delaying a gear shift for a predetermined shift delay time period if it is determined that the shift delay is needed by reading the transmitted throttle compensation control flag, and of performing the gear shift.

7 Claims, 2 Drawing Sheets

SHIFT CONTROL METHOD FOR AUTOMATIC TRANSMISSION

FIELD OF THE INVENTION

The present invention relates to a shift control method and apparatus for an automatic transmission, and more particularly, to a shift control method and apparatus able to secure a stable shift response and minimize shift shock when the acceleration pedal is frequently depressed.

BACKGROUND OF THE INVENTION

Generally, an automatic transmission performs gear shifting according to vehicle speed, throttle opening angle and the like by controlling hydraulic pressure through a plurality of solenoid valves. That is, if it is determined that a specific shift condition is satisfied, hydraulic pressure supplied from an oil pump is controlled according to a solenoid valve duty control so that a specific friction element of the transmission is activated to cause the gear shift to occur.

Automatic transmissions have some problems in that torque fluctuations are inevitable due to their intrinsic structure, and gear shift performance becomes worse as engine output and engine speed become high. It is difficult to solve such problems by controlling only the automatic transmission, and therefore, recently, engine control has come to be simultaneously performed with the automatic transmission control.

Frequent acceleration pedal depression is often inevitable because of road conditions and traffic conditions, and consequently a downshift also frequently occurs. According to one prior art attempt at a solution, in which engine speed is compared with turbine speed to minimize shift shock during downshift, the throttle opening rate is controlled to be lower than a target throttle opening rate if the engine speed is lower than the turbine speed. If the engine speed becomes higher than the turbine speed, the throttle opening rate is controlled to be the target throttle opening rate. However, when the acceleration pedal is frequently depressed, only engine control is performed, without transmission control. Consequently, a stable shift feeling cannot be secured, and shift shock frequently occurs.

SUMMARY OF THE INVENTION

The present invention provides an automatic transmission control method and apparatus that secures a stable shift feeling and minimizes shift shock by controlling the transmission in combination with ECU (Electronic Control Unit) control of the engine based on engine speed and turbine speed.

One embodiment of the present invention comprises an ECU communicating and cooperating with a TCU (transmission control unit). Preferably, the ECU controls generation of a throttle compensation control flag indicative of whether a shift delay is needed. The ECU also controls sending of the generated throttle compensation control flag to the TCU, when the throttle opening rate is controlled in such a way that the throttle opening rate is not proportional to the depression of the acceleration pedal. The TCU controls delay of a gear shift for a predetermined shift delay time period if it is determined that the shift delay is needed by reading the transmitted throttle compensation control flag. The TCU further controls performance of the gear shift.

According to a preferred embodiment, the ECU control preferably comprises: determining whether the throttle compensation control flag is equal to 1; determining whether an engine speed is lower than a turbine speed if it is determined that the throttle compensation control flag is not equal to 1; determining whether a throttle opening rate is greater than a predetermined throttle opening rate if it is determined that the engine speed is lower than the turbine speed; determining whether an amount of change in the throttle opening rate is greater than a predetermined amount of change in the throttle opening rate if it is determined that the throttle opening rate is greater than the predetermined throttle opening rate; and setting the throttle compensation control flag as 1 and transmitting the throttle compensation control flag to the TCU if it is determined that the amount of change in the throttle opening rate is greater than a predetermined amount of change in the throttle opening rate.

According to another preferred embodiment, the TCU control preferably comprises: determining whether the transmitted throttle compensation control flag is equal to 1; determining whether the shift is under way if it is determined that the transmitted compensation control flag is equal to 1; delaying the shift for the predetermined shift delay time period if it is determined that the shift is under way; and performing the shift by outputting a shift signal and resetting the throttle compensation control flag.

According to yet another preferred embodiment, the present invention provides a shift control method for an automatic transmission comprising: determining on the basis of an engine speed, a turbine speed and a throttle opening rate whether predetermined shift delay conditions are satisfied; delaying a gear shift for a predetermined time period if it is determined that the predetermined shift conditions are satisfied; and performing a gear shift.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
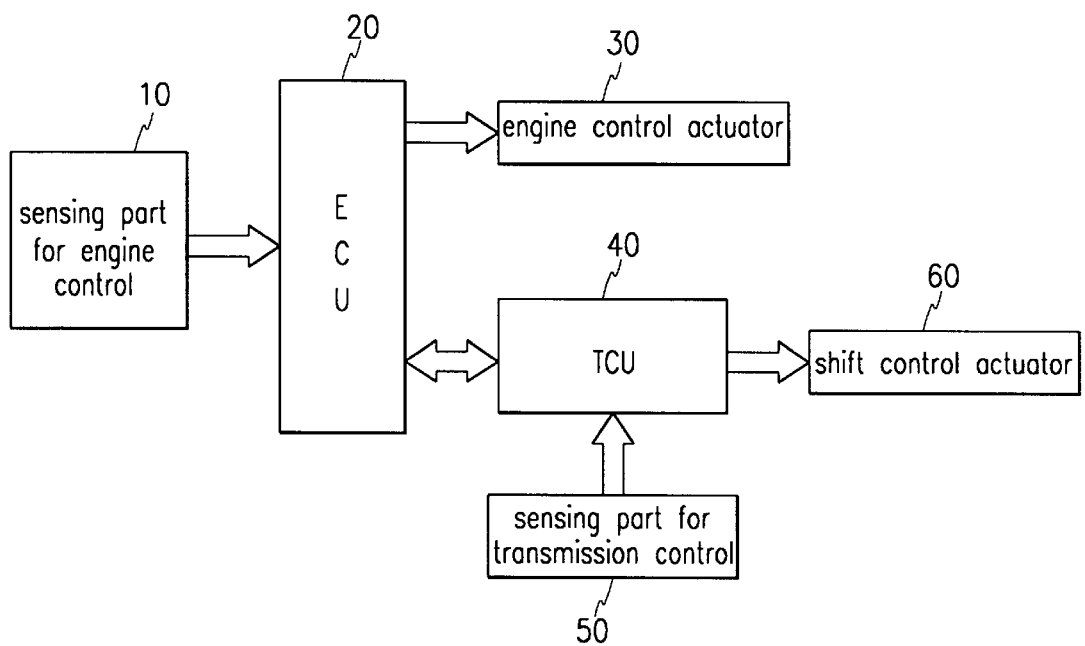
FIG. 1 is a block diagram of a shift control system and method according to the present invention.

Referring to FIG. 1, a sensing part for engine control 10 detects driving conditions and inputs corresponding signals to an ECU 20, and the ECU 20 controls an engine control actuator 30 by comparing the input signals from the sensing part for engine control 10 with stored data. The ECU 20 also sends data for shift control to a transmission control unit (hereinafter referred to as a TCU) 40, and the TCU 40 controls a shift control actuator 60 by comparing the data input from the ECU and data input from a sensing part for shift control 50 with stored data.

The sensing part for engine control 10 may comprise a vehicle speed sensor, a crankshaft angle sensor, an engine speed sensor, a coolant temperature sensor, a turbine speed sensor, or the like, that provide various data for engine control. The sensing part for transmission control 50 may comprise an input shaft speed sensor, an output shaft speed sensor, an inhibitor switch, a brake switch, or the like, that provide data for transmission control.

The engine control actuator 30 generally comprises all actuators that are needed for engine control, and the shift control actuator 60 comprises all actuators that are needed for shift control, as would be understood by persons skilled in the art.

The ECU 20 and TCU 40 preferably comprise processors that execute predetermined program steps from associated memories based on inputs from sensing parts 10 and 50 in order to send control signals to their respective actuators 30 and 60 for control of the engine and transmission in accordance with the program. Persons of ordinary skill in the art may program ECU 20 and TCU 40 based on the teachings of the present invention and the general knowledge in the art.

The ECU 20 preferably sends data to the TCU 40 via CAN communication. The CAN communication performs multiplex communications via a CAN bus line. Using CAN communication, it is possible to send and receive all data that are needed for each controller.

Figure 2:
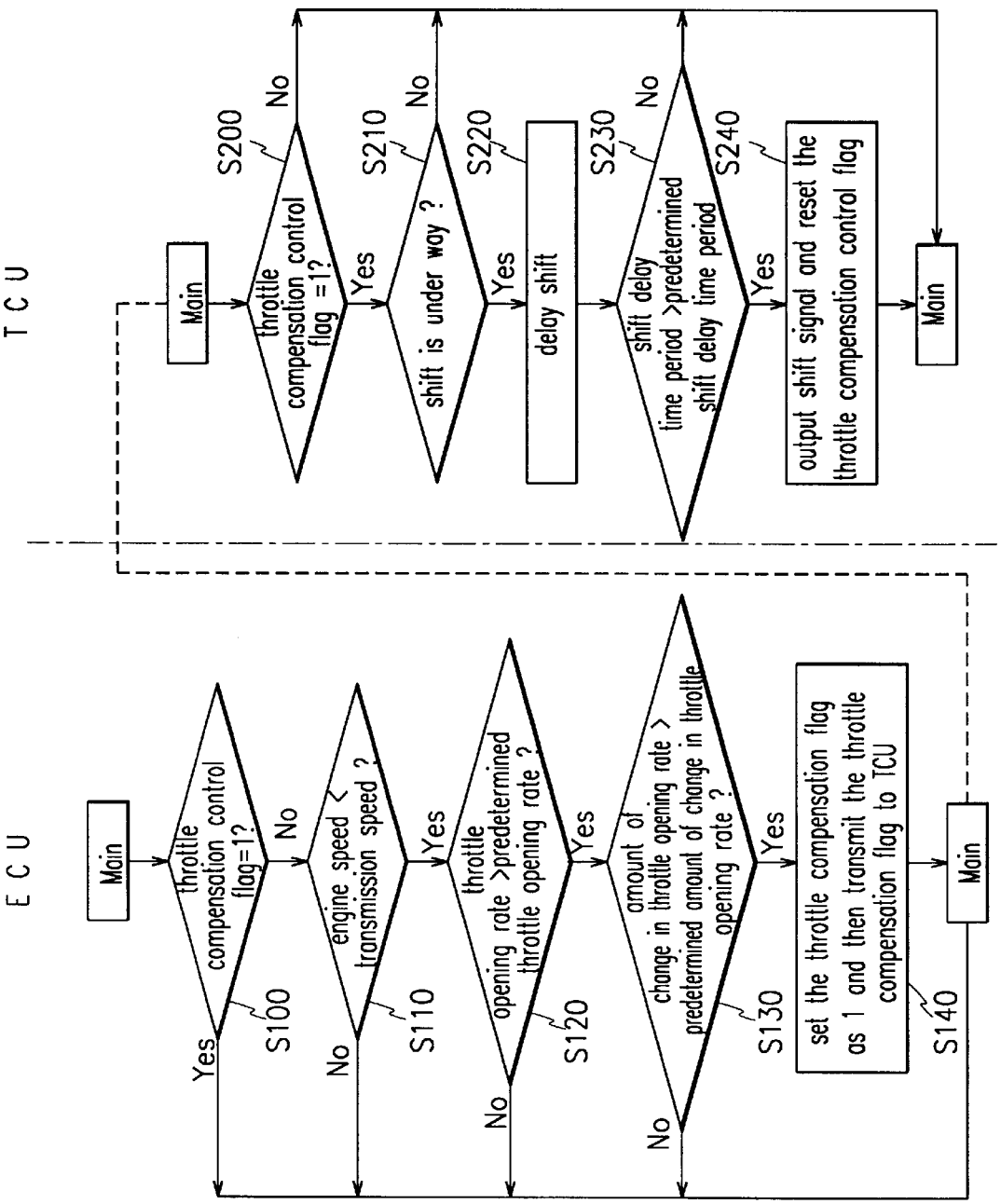
FIG. 2 is a flowchart showing the automatic transmission control method according to the present invention.

As shown in FIG. 2, the ECU determines if a predetermined condition is satisfied, and if it is determined that the predetermined condition is satisfied, the ECU sends corresponding data to the TCU. The TCU then performs the shift control according to the data. That is, the ECU sets a throttle compensation control flag and sends the flag to the TCU. The throttle compensation control flag is set as 1 when the predetermined condition is satisfied, and otherwise it is set as 0.

If the acceleration pedal is depressed, the ECU determines if the value of the throttle compensation control flag is equal to 1 (S100). If it is determined that the value of the throttle compensation control flag is equal to 1 in step S100, the ECU performs normal engine control. If it is determined that the value of the throttle compensation control flag is not equal to 1 in step S100, the ECU determines if the engine speed is lower than the turbine speed (S110).

If it is determined that the engine speed is not lower than the turbine speed, the ECU performs normal engine control. However, if it is determined that the engine speed is lower than the turbine speed, the ECU then determines whether the throttle opening rate is greater than a predetermined throttle opening rate (S120).

If it is determined that the throttle opening rate is greater than the predetermined throttle opening angle, the ECU determines whether the amount of change in the throttle opening rate is greater than a predetermined amount of change in the throttle opening rate (S130).

If it is determined that the amount of change in the throttle opening rate is greater than the predetermined amount of change in the throttle opening rate, the ECU determines that a gear shift delay is needed and sets the throttle compensation control flag as 1, and sends the flag to the TCU (S140).

In steps S110, 120 and 130, if the three conditions are satisfied, the ECU determines that a gear shift delay is needed, and sets the throttle compensation control flag as 1 for a shift delay of the automatic transmission.

Meanwhile, the TCU determines whether the value of the throttle compensation control flag is equal to 1 (S200). If it is determined that the throttle compensation control flag is equal to 1, the TCU then determines whether a gear shift is under way (S210).

If it is determined that a gear shift is under way, the TCU selects a predetermined shift delay time and delays the gear shift for the predetermined shift delay time period (S220). The TCU determines if the gear shift delay time period is longer than the predetermined shift delay time period (S230), and if it is, the TCU outputs a gear shift signal and resets the throttle compensation control flag (S240).

In step S210, the predetermined gear shift delay time period is preferably determined according to a vehicle speed, a shift range, a throttle opening rate, and the like. If the conditions for shift delay control are not satisfied in steps S200, S210 and S220, a normal shift control is performed.

As stated above, if the conditions for shift delay control are satisfied, the TCU delays the gear shift for a predetermined shift delay time period such that stable shift performance is secured and shift shock is minimized.

What is claimed is:

1. A shift control system for an automatic transmission of a vehicle including an engine throttle, said system comprising:
    an electric control unit generating a throttle compensation control flag indicative of whether a shift delay is needed when a throttle opening rate is not proportional to depression of an acceleration pedal; and
    a transmission control unit communicating with the electronic control unit to receive said control flag, said transmission control unit delaying a gear shift for a predetermined shift delay time period based on the received throttle compensation control flag.

2. A shift control system for an automatic transmission of a vehicle including an engine throttle, said system comprising:
    an electric control unit generating a throttle compensation control flag indicative of whether a shift delay is needed when a throttle opening rate is not proportional to depression of an acceleration pedal; and
    a transmission control unit communicating with the electronic control unit to receive said control flag, said transmission control unit delaying a gear shift for a predetermined shift delay time period based on the received throttle compensation control flag,
    wherein the electronic control unit executes a control program comprising:
        determining whether the throttle compensation control flag is equal to 1;
        determining whether engine speed is lower than turbine speed if it is determined that the throttle compensation control flag is not equal to 1;
        determining whether the throttle opening rate is greater than a predetermined throttle opening rate if it is determined that the engine speed is lower than the turbine speed;
        determining whether an amount of change in the throttle opening rate is greater than a predetermined amount of change in the throttle opening rate if it is determined that the throttle opening rate is greater than the predetermined throttle opening rate; and
        setting the throttle compensation control flag as 1 and sending the throttle compensation control flag to the transmission control unit if it is determined that the amount of change in the throttle opening rate is greater than said predetermined amount of change in the throttle opening rate.

3. A shift control system for an automatic transmission of a vehicle including an engine throttle, said system comprising:
    an electric control unit generating a throttle compensation control flag indicative of whether a shift delay is needed when a throttle opening rate is not proportional to depression of an acceleration pedal; and a transmission control unit communicating with the electronic control unit to receive said control flag, said transmission control unit delaying a gear shift for a predetermined shift delay time period based on the received throttle compensation control flag, wherein the transmission control unit executes a control program comprising:

determining whether the received throttle compensation control flag is equal to 1;

determining whether the shift is under way if it is determined that the received compensation control flag is equal to 1;

delaying the gear shift for the predetermined shift delay time period if it is determined that the shift is under way; and performing the gear shift by outputting a shift signal and resetting the throttle compensation control flag.

4. A shift control method for an automatic transmission, the method comprising:

determining on the basis of an engine speed, a turbine speed and a throttle opening rate whether predetermined shift delay conditions are satisfied, said shift delay conditions comprising at least one of the engine speed being lower than the turbine speed, the throttle opening rate being greater than a predetermined throttle opening rate, and an amount of change in the throttle opening rate being greater than a predetermined amount of change in a throttle opening rate;

delaying a gear shift for a predetermined time period if it is determined that the predetermined shift conditions are satisfied; and performing a gear shift.

5. The shift control method according to claim 4, wherein the predetermined time period is determined on the basis of a vehicle speed, a shift range, and the throttle opening rate.

6. The shift control method according to claim 4, wherein the determining step is performed by an electronic control unit, and the delaying and performing steps are performed by a transmission control unit.

7. The shift control method according to claim 6, wherein the determining step comprises generating a throttle compensation control flag indicative of whether a shift delay is needed and sending the flag to the transmission control unit, and the delaying step comprises determining whether the predetermined shift delay conditions are satisfied by reading the received flag.

\* \* \* \* \*